(12) United States Patent
Zapletal et al.

(10) Patent No.: US 10,110,624 B2
(45) Date of Patent: Oct. 23, 2018

(54) DISCOVERING AND PROVISIONING COMPUTING DEVICES IN A SECURITY ENHANCED ENVIRONMENT

(71) Applicant: Red Hat Israel, Ltd., Raanana (IL)

(72) Inventors: Lukas Zapletal, Velky Tynec (CZ); Ohad Anaf Levy, Raanana (IL)

(73) Assignee: RED HAT ISRAEL, LTD., Raanana (IL)

( * ) Notice: Subject to any disclaimer, the term of this patent is extended or adjusted under 35 U.S.C. 154(b) by 144 days.

(21) Appl. No.: 15/132,655

(22) Filed: Apr. 19, 2016

(65) Prior Publication Data

US 2017/0302694 A1    Oct. 19, 2017

(51) Int. Cl.
H04L 29/06    (2006.01)
G06F 21/57    (2013.01)

(52) U.S. Cl.
CPC ........ *H04L 63/1433* (2013.01); *G06F 21/575* (2013.01)

(58) Field of Classification Search
CPC ............. G06F 11/1417; G06F 11/1433; G06F 9/4406; G06F 8/63; G06F 8/65; H04L 41/0853
See application file for complete search history.

(56) References Cited

U.S. PATENT DOCUMENTS

| | | |
|---|---|---|
| 7,664,834 B2 | 2/2010 | Keith, Jr. |
| 8,433,890 B2 | 4/2013 | Arditti et al. |
| 8,505,003 B2 | 8/2013 | Bowen |
| 8,850,174 B1 | 9/2014 | Mahmoud et al. |
| 8,996,667 B2 | 3/2015 | Clerc et al. |
| 9,063,821 B1 | 6/2015 | Emelyanov et al. |
| 9,280,360 B2 | 3/2016 | Xu et al. |

FOREIGN PATENT DOCUMENTS

CN    102053848 A    5/2011

OTHER PUBLICATIONS

"Booting a Machine Over the Network Without PXE", http://fa.freebsd.hackers.narkive.com/K4K7C7cS/booting-a-machine-over-the-network-without-pxe, Sep. 14, 2003, 4 pages.
OSDIR.com, "Subject: Booting a Machine over the Network Without PXE", http://osdir.com/ml/freebsd-hackers/2003-09/msg00057.html, Sep. 1, 2003, 5 pages.
"Server Provisioning Without PXE", http://serverfault.com/Questions/638141/Server%20provisioning%20without%20PXE, 1 page.

(Continued)

*Primary Examiner* — Brian F Shaw
(74) *Attorney, Agent, or Firm* — Womble Bond Dickinson (US) LLP; William D. Jacobs, Jr.

(57) ABSTRACT

Systems and methods for discovering and provisioning computing devices within a computing environment. An example method may comprise: loading a first kernel from a removable storage, wherein the first kernel identifies device information of the computing device when executed; transmitting a provisioning request comprising the device information to a provisioning device over a network; receiving provisioning data and a second kernel over a network, the second kernel comprising an operating system installer; and overwriting the first kernel with the second kernel.

20 Claims, 5 Drawing Sheets

(56) References Cited

OTHER PUBLICATIONS

Dehaan, Michael, "Cobbler: How to Set Up a Network Boot Server in 10 Minutes", http://magazine.redhat.com/2007/08/10/cobbler-how-to-set-up-a-network-boot-server-in-10-minutes, 7 pages.
Wikipedia, "Booting", https://en.wikipedia.org/wiki/Booting#BOOT-LOADER, last modified on Mar. 24, 2016, 17 pages.
Wikipedia, "Kexec", https://en.wikipedia.org/wiki/Kexec, last modified on Aug. 21, 2015, 2 pages.

DISCOVERING AND PROVISIONING COMPUTING DEVICES IN A SECURITY ENHANCED ENVIRONMENT

TECHNICAL FIELD

The present disclosure generally relates to discovering and provisioning computing devices over a computer network, and more specifically relates to enabling a computing device to be discovered and provisioned in a security enhanced manner.

BACKGROUND

Modern data centers may include infrastructure that enables a newly added machine to be automatically configured. The newly added machine may be added to the data center without an operating system, which is often referred to as adding a bare machine (e.g., bare metal machine). The bare machine may include a built in module that enables it to contact the computer network and the computer network may push confidential or proprietary computer programs (e.g., applications and operating systems) and configuration information to the bare machine. This may enable the bare metal machine to install an Operating System (OS) and contribute to the computer network.

BRIEF DESCRIPTION OF THE DRAWINGS

The present disclosure is illustrated by way of examples, and not by way of limitation, and may be more fully understood with references to the following detailed description when considered in connection with the figures, in which.

DETAILED DESCRIPTION

Many existing computing environments (e.g., data centers) may be exposed to a security vulnerability when a third party gains physical access to the computing environment and adds an imposter device. The security vulnerability may arise because the computer environment may push confidential or proprietary computer programs and configuration information to the imposter device. To address this security vulnerability, computing environments may be configured to restrict the transmission of computer programs or configuration information to newly added computing devices. This restriction may require administrative users to manually install and configure computer programs on newly added devices. Manually installing and configuring computer programs is time consuming and may reduce the dynamic expansion and scalability of a data center.

Described herein are methods and systems for discovering and provisioning computing devices in a security enhanced manner. A computing device may be physically added to a computing environment without an operating system, for example, the computing device may be a bare computing device (e.g., bare metal device) in the same state it was received from a computing device manufacturer. The computing device may be added to the environment by coupling the computing device with one or more cables (e.g., power cable, network cable) and with removable media. The removable media may include a first kernel that may be loaded onto the computing device and run a discovery module and a network module. The discovery module may gather device information, such as hardware information (e.g., processor, memory) and firmware information (e.g., Basic Input/Output System (BIOS), Unified Extensible Firmware Interface (UEFI)). The network module may enable the computing device to transmit the device information to a provisioning system and to access one or more additional kernels to configure and install an operating system onto the computing device.

The provisioning system may receive device information from the computing device and may register and provision the computing device based on the device information. The provisioning system may analyze the received device information to determine one or more computing features of the computing device. The provisioning system may then register the computing device and select a second kernel (e.g., OS installer) and one or more other kernels (e.g., Full Operating Systems) to be loaded onto the computing device. The kernel selected (e.g., second kernel) may be referenced by provisioning data that may be sent to the computing device. The computing device, while running the first kernel, may retrieve the second kernel from a network storage and load the second kernel, which may install and configure an operating system onto the computing device.

Systems and methods described herein include technology for enhancing the discovery and provisioning of computing devices in a security enhanced computing environment. Security enhanced computing environments may eliminate portions of an infrastructure that implement automatically discoverable computing devices. For example, a security enhanced computing environment may avoid a Pre-boot Execution Environments (PXE) that enables a bare computing device to broadcast a request for an operating system and receive confidential or proprietary computer programs (e.g., applications and operating systems) and configuration information over the network. An advantage of the technology disclose herein, is that it may reduce the security vulnerabilities related to PXE yet still provide efficient discovery and provisioning of computing devices. For example, an IT administrator may have multiple bare-metal computing devices physically added to a data center. The IT administrator may selectively insert removable media into one or more of the computing device to make the computing device discoverable and enable the computing device to be provisioned by a provisioning device. The removable media may function as a key for adding the computing device to the security enhanced computing environment. The removable media may be inserted for (e.g., and not exceeding) the duration of time needed to load the first kernel and may then be removed and inserted into one or more other devices to initiate the discovery and provisioning process. Various aspects of the above referenced methods and systems are described in details herein below by way of examples, rather than by way of limitation.

Figure 1:
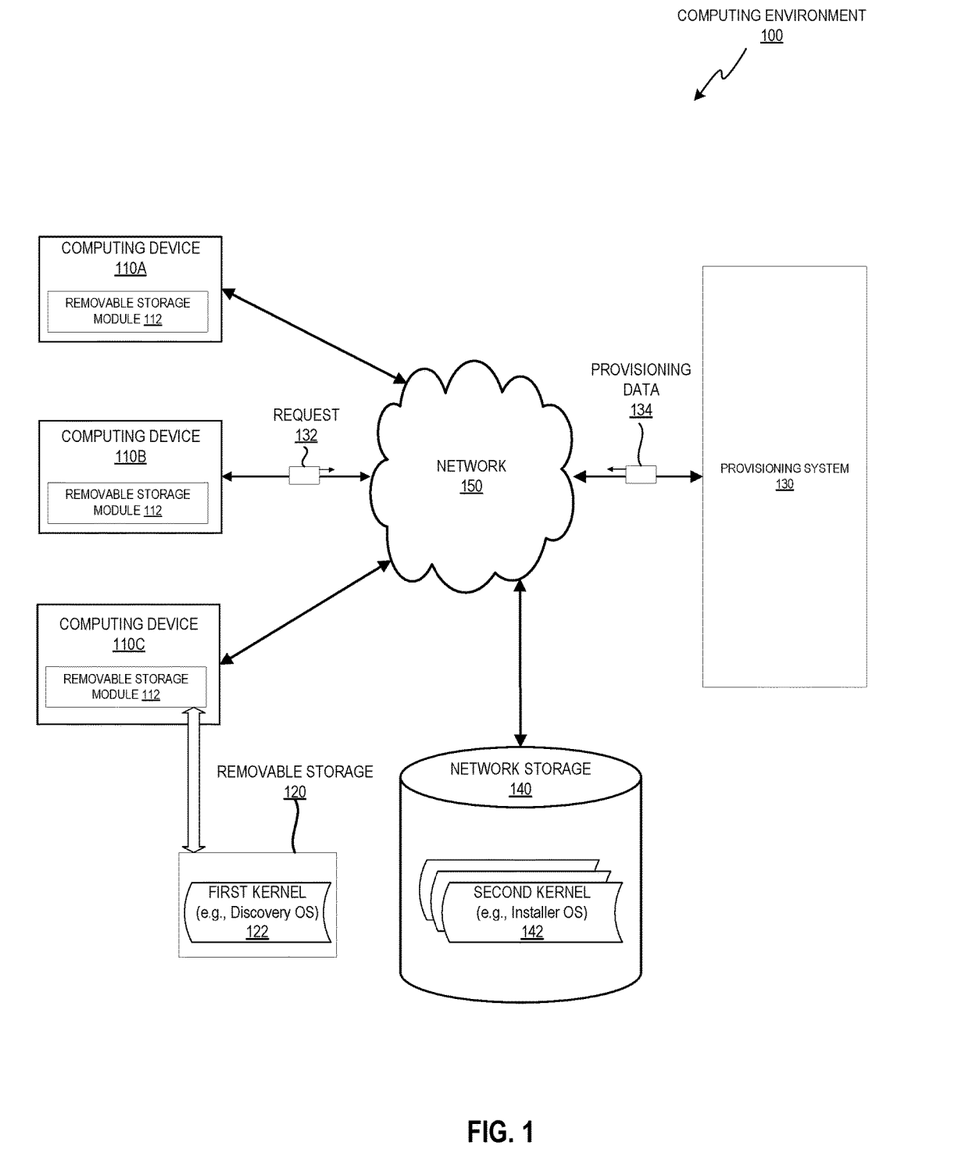
FIG. 1 depicts a high-level diagram of an example computing environment, in accordance with one or more aspects of the present disclosure.

FIG. 1 illustrates an example computing environment 100, in accordance with an implementation of the disclosure. Computing environment 100 may be a private, public, or hybrid computing environment (e.g., cloud) for storing and processing data. Computing environment 100 may span one or more facilities, which may be the same or similar to a computer room or data center. The one or more facilities may house computer systems and associated components, such as, computing devices, storage systems, power supplies, environment controls, or security devices. Computing environment 100 may be a security enhanced computing environment that restricts or regulates the dissemination of configuration information and computer programs to newly added computing devices. For example, the security enhanced computing environment may exclude support for certain communication protocols that do not provide enhanced security (e.g., Trivial File Transfer Protocol (TFTP)). In one example, the security enhanced computing environment may involve the use of static IP addresses, which may avoid the computing environment from pushing confidential networking information to newly added computing device. In another example, the security enhanced computing environment may permit dynamic IP addresses (e.g., DHCP) but may restrict the pulling or pushing of executable programs to newly added machines. This may provide the flexibility of providing network configuration information without providing confidential or proprietary computing programs to newly added computing devices. As shown in FIG. 1, computing environment 100 may include computing devices 110A-C, removable storage 120, provisioning system 130, network storage 140, and a network 150. Network 150 may include a public network (e.g., the Internet), a private network (e.g., a local area network (LAN) or wide area network (WAN)), a wired network (e.g., Ethernet network), a wireless network (e.g., an 802.11 network or a Wi-Fi network), a cellular network (e.g., a Long Term Evolution (LTE) network), routers, hubs, switches, and/or various combinations thereof.

Computing devices 110A-C may be any computing device capable of participating in computing environment 100 once configured. Computing devices 110A-C may be client devices (e.g., desktop, laptop, tablet, or phone), server devices (e.g., web server, application server, or database server), data storage devices (e.g., Network Attached Storage (NAS) or Storage Area Network (SAN)), other computing devices, or a combination thereof. Some or all of the computing devices 110A-C may be configured as a host for running one or more virtual machines (VMs), containers, or other virtualization technology. Provisioning system 130 may provision and manage the computing devices and the one or more virtual machines and containers to contribute to computing environment 100.

Computing devices 110A-C may be added to computing environment 100 with or without operating systems. A computing device without an operating system (e.g., no kernel) may be described as a bare computing device or a bare-metal computing device. A computing device without an operating system (e.g., lacking, missing, or absent an operating system) may be capable of performing a device initialization procedure (e.g., BIOS Initialization) but may or may not include a boot loader. The computing device may be added to computing environment 100 by connecting the computing device with one or more components of computing environment 100, such as, connecting the computing device to a power source, a network component, or user interface devices (e.g., keyboard and monitor).

Each of the computing devices 110A-C may include a removable storage module 112 that provides the computing device with access to data available on removable storage 120. Removable storage module 112 may be integrated into the computing device (e.g., plug-and-play interface, optical disc drive) or may be removable from the computer (e.g., disc drive, memory card reader plugged into the plug-and-play interface). In one example, removable storage module 112 may be any standardized connection point such as a USB interface (e.g., USB port, USB adapter). In another example, the removable storage module 112 may be a media drive that is integrated into the computer and may be an optical disc drive (e.g., CD, DVD), a diskette drive (e.g., zip disk drive, floppy drive), or other media drive capable of receiving or interacting with removable storage 120.

Removable storage 120 may be any portable data storage medium that can store data and be moved by a user or machine from one computing device to another computing device. Removable storage 120 may be removable media that can be read by removable storage module 112. Some examples of removable storage 120 include: flash drives (e.g., USB flash drive); optical discs (CD, DVD); memory cards (e.g., flash memory card, memory stick, Secure Digital® (SD) card, CompactFlash®); diskette (e.g., zip disk, floppy drive); external hard drives (e.g., SCI, IDE, SSD); magnetic tape; other data storage media; or a combination thereof. Removable storage 120 may be used to store computer programs or configuration information that may be used by computing devices 110A-C to interact with computing environment 100. For example, removable storage 120 may store a first kernel 122 or a portion of a first kernel 122.

First kernel 122 may be executed by one or more computing devices 110A-C and may enable a computing device to be discovered and provisioned by computing environment 100. First kernel 122 may be a part of an operating system that may be a generic kernel that supports a wide variety of computing devices having a variety of different hardware and computer program configurations. First kernel 122 may be based on any standard or proprietary kernel and may be the same or similar to a Linux® kernel, Microsoft Windows® kernel, Unix® kernel, Apple Mac OS® kernel, other kernel or combination thereof.

First kernel 122 may include or provide support for a discovery module, a user interface module, and a network module. The discovery module may enable the computing device to scan itself to identify device information (e.g., hardware features and computer program features). The user interface module may enable a user to provide input to assist the discovery or provisioning of the computing device. The user interface module may provide a user with a graphical interface (e.g., graphical user interface (GUI)), textual interface (e.g., command line interface), audio interface (e.g., spoken commands), other interface, or combination of interfaces. The network module may enable the computing device to communicate the device information, user input, or a combination thereof to provisioning system 130.

Provisioning system 130 may receive data from the computing device and may register and provision the computing device so that the computing device may contribute to computing environment 100 (e.g., by hosting VMs, containers, etc.). Provisioning system may receive a request 132 from the computing device that may include some or all of the device information for the computing device. In response, the provisioning system may register the computing device and subsequently provide provisioning data 134 to the computing device. Provisioning data may include a reference to network storage 140 and second kernel 142. Request 132 and provisioning data 134 are discussed in more detail in regards to FIG. 2.

Network storage 140 may be any data storage device that is capable of storing data that can be accessed by computing devices 110A-C over network 150. Network storage 140 may be a network data storage device (e.g., network attached storage (NAS), storage area network (SAN), a server (e.g., file server, web server), one of the computing device 110A-C (e.g., peer device) or other device internal or external to computing environment 100. Network storage 140 may be used to store computer programs and configuration information that may be used by computing devices 110A-C to contribute to computing environment 100. For example, removable storage 120 may store a second kernel 142 or a portion of a second kernel 142.

Second kernel 142 may be executed by one or more of computing devices 110A-C and may modify the configuration of the computing device so that the computing device can provide a service to or for the computing environment 100. Second kernel 142 may run on the computing device and provision the device it is running on (e.g., local device). Second kernel may run in (e.g., and limited to) non-persistent storage (e.g., volatile storage, memory) without being installed or stored in persistent storage (e.g., non-volatile storage) of the computing device. Second kernel 142 may include or support an installer module that is capable of installing and configuring a third kernel. The third kernel may be a fully functioning operating system that enables the computing device to provide the service for computing environment 100. In one example, second kernel 142 may be an operating system installer that is downloaded onto the computing device and when executed installs a particular operating system onto persistent storage of the computing device.

In another example of computing environment 100, removable storage 120 may include security information that may be used by computing devices 110A-C to interact with computing environment 100. The security information may be a security token (e.g., password, encryption key) and may be associated with a specific removable storage device and/or a specific user or machine that inserts the removable storage. The security information may be included within request 132 and used for authorizing or authenticating computing device 110 when requesting provisioning data 134. Provisioning system 130 may receive the security token and user credentials (e.g., username and password) to enhance authentication and/or provide audit functionality (e.g., traceability). The security information may be embedded within an image (e.g., ISO image) that includes first kernel 122 or may be included as a separate data structure (e.g., file) along with an image including first kernel 122.

Figure 2:
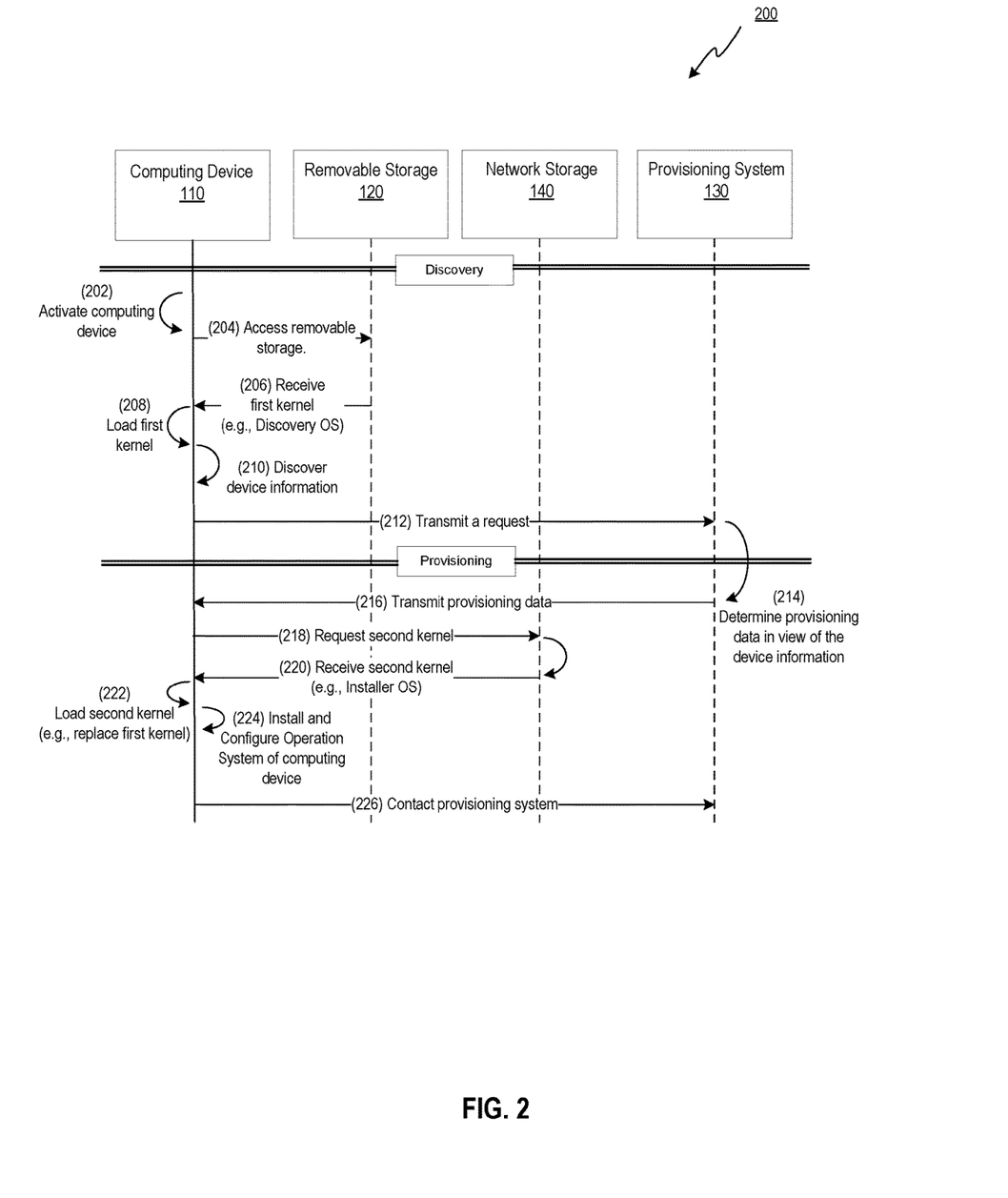
FIG. 2 depicts a high-level diagram of example interactions between a computing device, a removable storage, a network storage and a provisioning system, in accordance with one or more aspects of the present disclosure.

FIG. 2 depicts a block diagram 200 of example interactions between computing device 110, removable storage 120, network storage 140 and provisioning system 130 for discovering and provisioning computing device 110, according to various implementations of the present disclosure. The interactions are represented by arrows and indicate communications between the entities. As shown in FIG. 2, the arrows are directional arrows that may indicate the device that initiated the communication (e.g., message or signal) or transmitted the communication, but any or all of the arrows may be initiated by the receiving device, transmitting device or a combination thereof. The interactions may be grouped into a discovery phase and provisioning phase and may begin with interaction 202.

During interaction 202, the computing device may be activated (e.g., powered on) and perform a hardware initialization procedure. Computing device 110 may be activated before, during, or after receiving removable storage 120. In one example, a user or machine may couple (e.g., insert) removable storage 120 with computing device and may subsequently activate the computing device with a power up instruction (e.g., physically press power-on button or remotely signal power-on). In another example, insertion of removable storage 120 may initiate the activation of computing device 110. In a further example, computing device 110 may have been previously activated and may have already begun or completed the hardware initialization procedure when the removable storage is inserted. Prior to the insertion of removable storage 120, computing device 110 may have determined that there are no available operating systems and may be in a stand-by mode awaiting instructions. After the computing device is activated, the computing device may proceed to interaction 204.

During interaction 204, computing device 110 may access removable storage 120. This may involve initiating the removable storage module of computing device 110 and determining if removable storage includes a bootable kernel (e.g., first kernel). When removable storage includes a bootable kernel the computing device 110 may proceed to interaction 206 and may receive the first kernel from removable storage 120. In one example, computing device 110 may store the first kernel in non-persistent storage (e.g., memory) without storing it in persistent storage (e.g., disk storage).

During interaction 208, computing device 110 may load the first kernel. Loading the first kernel may involve using a program that performs boot loading functionality and loads the first kernel into memory. Once the first kernel is loaded into memory, it may be begin by executing a discovery module, a user interface module, and/or a network module. The discovery module may enable computing device 110 to scan itself to discover device information (e.g., interaction 210). The user interface module may enable a user to provide input via a graphical interface (e.g., graphical user interface (GUI)), textual interface (e.g., command line interface), audio interface (e.g., spoken commands), other interface, or combination of interfaces. The user input may include information to be assigned to computing device 110 as well as information for communicating with the provisioning device or other devices of the computing environment. For example, the user input may include IP addresses, computer names, user credentials (e.g., user name, password), locations (e.g., network addresses, URLs) of devices on the network (e.g., provisioning system 130, network storage 140). The network module may enable computing device 110 to communicate over a network and to perform interaction 210.

During interaction 212, computing device 110 may transmit a request to provisioning system 130. The request may include device information, user input, or a combination thereof. The request (e.g., request 132 of FIG. 1) may result in computing device 110 being registered as a new asset of the computing environment. In one example, the request may initiate a response that includes provisioning data. In another example, the request may cause computing device 110 to be registered and may not invoke a response with provisioning data. For example, the provisioning server may determine that there is no current need for an additional device and may wait a duration of time (e.g., minutes, hours, days) before determining which operating system or configuration should be installed on computing device 110.

During interaction 214, the provisioning system may determine provisioning data in view of the device information within the request. The provisioning system may be aware of computing and storage needs of the computing environment and based on these needs it may determine a (e.g., web server, database server, application server) function of the computing device 110 to assist in meeting these needs. The provisioning data may include information for configuring computing device 110. The information may be in the form of an installation recipe that includes information (e.g., textual information or binary information) with one or more commands and parameters for the commands. In one example, the provisioning data may also include executable computer programs, such as the second kernel, one or more packages, or a combination thereof. In another example, the provisioning data may include information that identifies a location where executable computer programs may be retrieved with or without including executable computer programs.

During interaction 216, provisioning system 130 may transmit the provisioning data to computing device 110. Computing device 110 may analyze the provisioning data and determine the second kernel is on network storage 140. Computing device 110 may then request the second kernel from network storage 140 (interaction 218) and may subsequently receive the second kernel from network storage 140 (interaction 220).

During interaction 222, computing device 110 may load the second kernel, which may replace the first kernel. Replacing the first kernel may be performed by at least two separate methods. The first method involves overwriting the first kernel with the second kernel while the first kernel is executing. Computing device 110 may utilize the first method when computing device 110 supports a mechanism for "live booting" a new kernel over a currently running kernel. The first method may perform live booting by skipping a hardware initialization procedure and/or a boot loader procedure and may directly load the new kernel into memory (e.g., main memory) and begin executing it. This may be advantageous because it may bypass (e.g., avoid or circumvent) a reboot and avoid the time needed to perform the reboot. The first method may be the same or similar to kernel execution (kexec) functionality. Kexec functionality may enable computing device 110 to transition from executing an original kernel to executing a new kernel and may be available on an operating system such as Linux (Red Hat® Linux). Kexec functionality may be included in the original kernel and execute within a user space or kernel space. Kexec functionality may load data (e.g. new kernel) and unload data (e.g., original kernel) into the kernel space. In one example, the original kernel may instruct computing device 110 to load the new kernel or a portion of the new kernel and to unload the original kernel to initiate the transition from the original kernel to the new kernel. In another example, the original kernel may instruct the computing device 110 to have both kernels loaded (e.g., new kernel and original kernel) so that both the original kernel and the new kernel execute in parallel for a duration of time.

The second method for loading the second kernel may involve overwriting the first kernel with the second kernel by modifying the boot configuration of computing device 110 and rebooting computing device 110. This method may involve computing device 110 executing instructions that modify the boot configuration. In one example, the instruction may alter a boot order so that computing device 110 searches a storage location with the second kernel before the storage location with the first kernel (e.g., removable storage 120). In another example, the instruction may modify the boot configuration to specify the second kernel or the location where the second kernel is stored. In either example, the method may instruct computing device 110 to reboot. The reboot instruction may result in performing the same hardware initialization procedure as was performed earlier or performing an additional hardware initialization procedure (e.g., abbreviated hardware initialization procedure) and running the boot loader with the modified configuration to load the second kernel.

During interaction 224, computing device 110 may run the second kernel to install and configure an operating system for computing device 110. The second kernel may be a computer program installer that is capable of preparing a program, installing a program, configuring a program, deploying a program or a combination thereof. Computer program installer may install one or more operating systems, device drivers, applications, other programs or combination thereof. Once the second kernel has completed the installation and configuration of the operating system, it may instruct computing device 110 to reboot or perform either the first method or second method discussed above to overwrite the second kernel with the operating system (e.g., third kernel). In one example, computing device 110 may reboot and determine if additional provisioning is required (e.g., contact provisioning system 130). If no additional provisioning is required computing device 110 may continue and boot from local storage (e.g., hard disk) to load the operating system.

During interaction 226, computing device 110 may be running the third kernel and may contact the provisioning system 130. The contact may function as a notification that the computing device 110 is operational or may request additional provisioning data to complete the installation and configuration.

Figure 3:
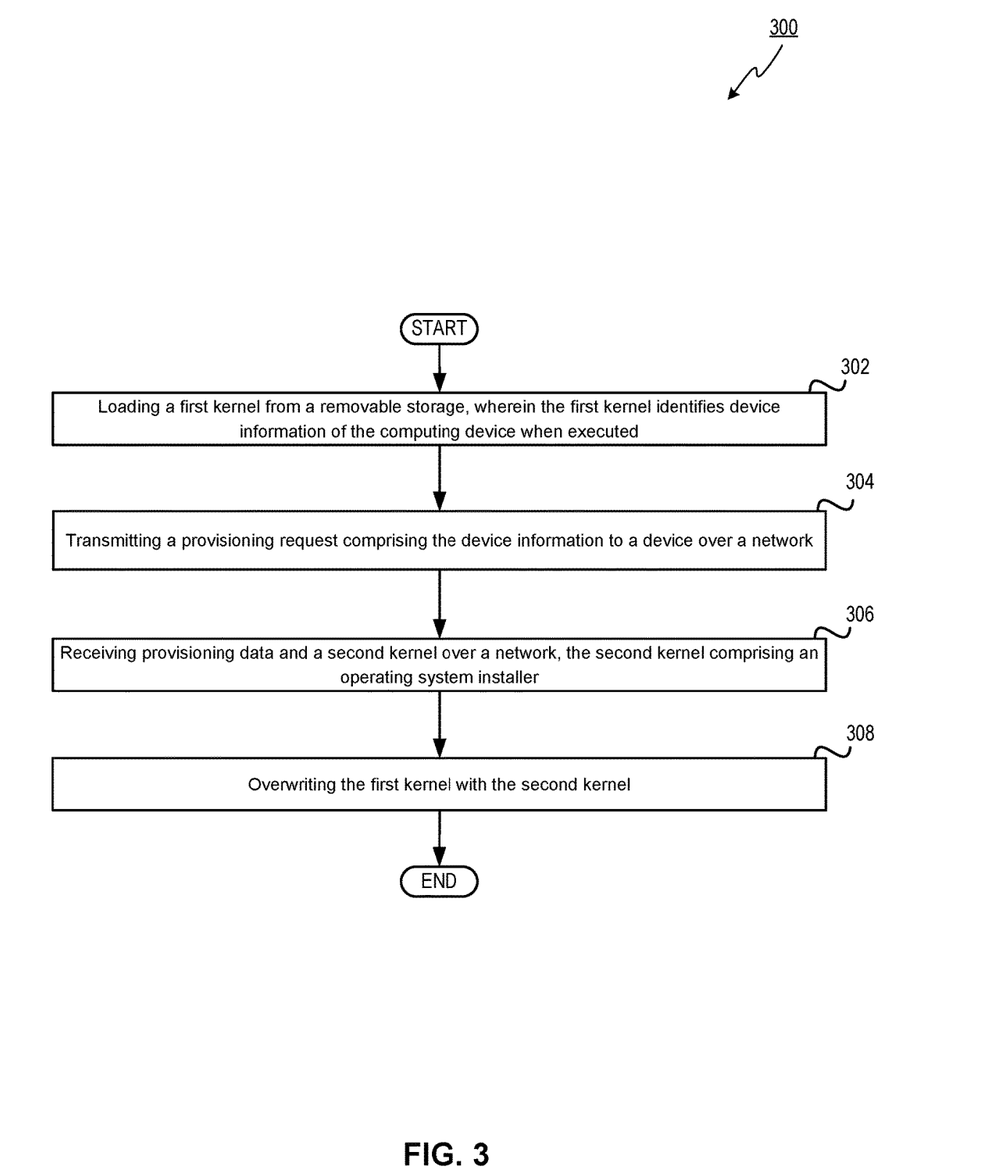
FIG. 3 depicts a flow diagram of an example method for discovering and provisioning a computing device, in accordance with one or more aspects of the present disclosure.
Figure 4:
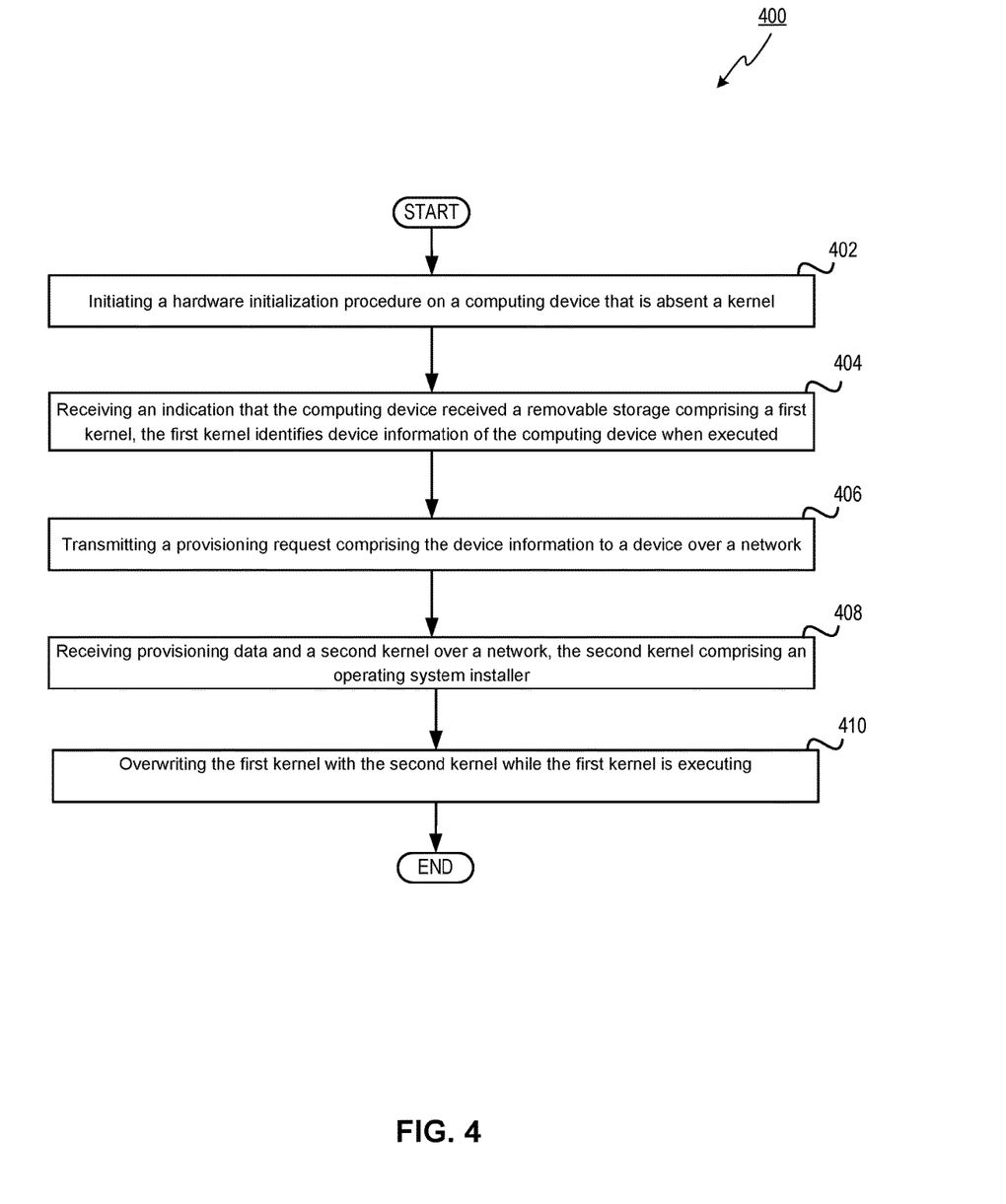
FIG. 4 depicts a flow diagram of another example method for discovering and provisioning a computing device, in accordance with one or more aspects of the present disclosure.

FIGS. 3 and 4 depict flow diagrams for illustrative examples of methods 300 and 400 for discovering and provisioning computing devices within a computing environment. Method 300 may overwrite a first kernel with a second kernel using multiple different techniques whereas method 400 may overwrite the first kernel with the second kernel while the first kernel is executing (e.g., without a reboot). Methods 300 and 400 may be performed by processing devices that may comprise hardware (e.g., circuitry, dedicated logic), computer readable instructions (e.g., run on a general purpose computer system or a dedicated machine), or a combination of both. Methods 300 and 400 and each of their individual functions, routines, subroutines, or operations may be performed by one or more processors of the computer device executing the method. In certain implementations, methods 300 and 400 may each be performed by a single processing thread. Alternatively, methods 300 and 400 may be performed by two or more processing threads, each thread executing one or more individual functions, routines, subroutines, or operations of the method.

For simplicity of explanation, the methods of this disclosure are depicted and described as a series of acts. However, acts in accordance with this disclosure can occur in various orders and/or concurrently, and with other acts not presented and described herein. Furthermore, not all illustrated acts may be needed to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any computer-readable device or storage media. In one implementation, methods 300 and 400 may be performed by computing devices 110A-C as shown in FIGS. 1 and 2.

Referring to FIG. 3, method 300 may be performed by processing devices of a computing device (e.g., computing device 110) and may begin at block 302. At block 302, the processing device may load a first kernel from a removable media and the first kernel may identify device information of the computing device. The removable media may include a disk image in any format that is readable by the computing device, such as a file system format (e.g., File Allocation Table (FAT), or format that complies with an ISO image format. The disk image may be an archive of an optical disc (e.g., CD, DVD) and may include a first kernel and a user interface module. The user interface module may be for receiving user input indicating a static IP address and a location of a provisioning system. In one example, the computing device may be lacking (e.g., absent) support for a pre-boot execution environment (PXE).

At block 304, the processing device may transmit a provisioning request comprising the device information to a device over a network. The provisioning request may be transmitted from the computing device to a provisioning system. The provisioning request may initiate a registration of the computing device on the provisioning device.

At block 306, the processing device may receive provisioning data and a second kernel over a network and the second kernel may include an operating system installer. In one example, the first kernel from the removable media may discover the device information of the computing device and the second kernel may install an operating system selected in view of the discovered device information.

At block 308, the processing device may overwrite the first kernel with the second kernel. In one example, overwriting the first kernel with the second kernel may involve overwriting a portion of memory comprising the first kernel with the second kernel while the first kernel is executing. This may be the same or similar to loading an image of the second kernel over an image of the first kernel in memory. In another example, overwriting the first kernel with the second kernel may involve modifying a boot loader configuration of the computing device to load the second kernel and performing a hardware initialization procedure that loads the second kernel into memory. Responsive to completing the operations described herein above with references to block 308, the method may terminate.

Referring to FIG. 4, method 400 may be performed by processing devices of a computing device (e.g., computing device 110) and may begin at block 402. At block 402, the processing device may initiate a hardware initialization procedure on a computing device that is lacking a kernel (e.g., absent or missing a kernel). The computing device may be lacking a kernel prior to loading the first kernel from the removable media. In one example, the computing device may be assigned an IP address using a dynamic host configuration protocol (DHCP). In another example, the computing device may be assigned a static IP address without use of a dynamic host configuration protocol (DHCP). The static IP address may be received as user input via the user interface module embedded within one of the kernels (e.g., first or second kernel) or may be pre-configured within the kernel (e.g., pre-configured image). In the latter example, the IP address, network mask and default router may be embedded into the disk image during an image generation process.

At block 404, the processing device may receive an indication that the computing device received a removable storage comprising a first kernel, wherein the first kernel identifies device information of the computing device. In one example, the indication may be in response to a removable storage device being received by a USB interface of the computing device. In another example, the indication may be in response to a removable storage media being received by an optical disc drive of the computing device.

At block 406, the processing device may transmit a provisioning request comprising the device information to a device over a network. The provisioning request may comprise device information that includes at least one of: network information, processor information, memory information, or storage information. In addition, the device information may include information indicating the computing device supports overwriting a kernel while the kernel is running.

At block 408, the processing device may receive provisioning data and a second kernel over a network. The second kernel comprises an operating system installer. The provisioning data comprises information identifying a location on the network of the operating system installer and an instruction to overwrite the first kernel with the second kernel without rebooting.

At block 410, the processing device may overwrite the first kernel with the second kernel while the first kernel is executing. For example, the processing device of the computing device may load the first kernel from the removable media during a boot process and load the second kernel received over the network without performing a reboot process. In one example, the computing device is lacking an operating system when initiating a hardware initialization procedure and installs an operating system received over the network without performing an additional hardware initialization procedure. Responsive to completing the operations described herein above with references to block 410, the method may terminate.

Figure 5:
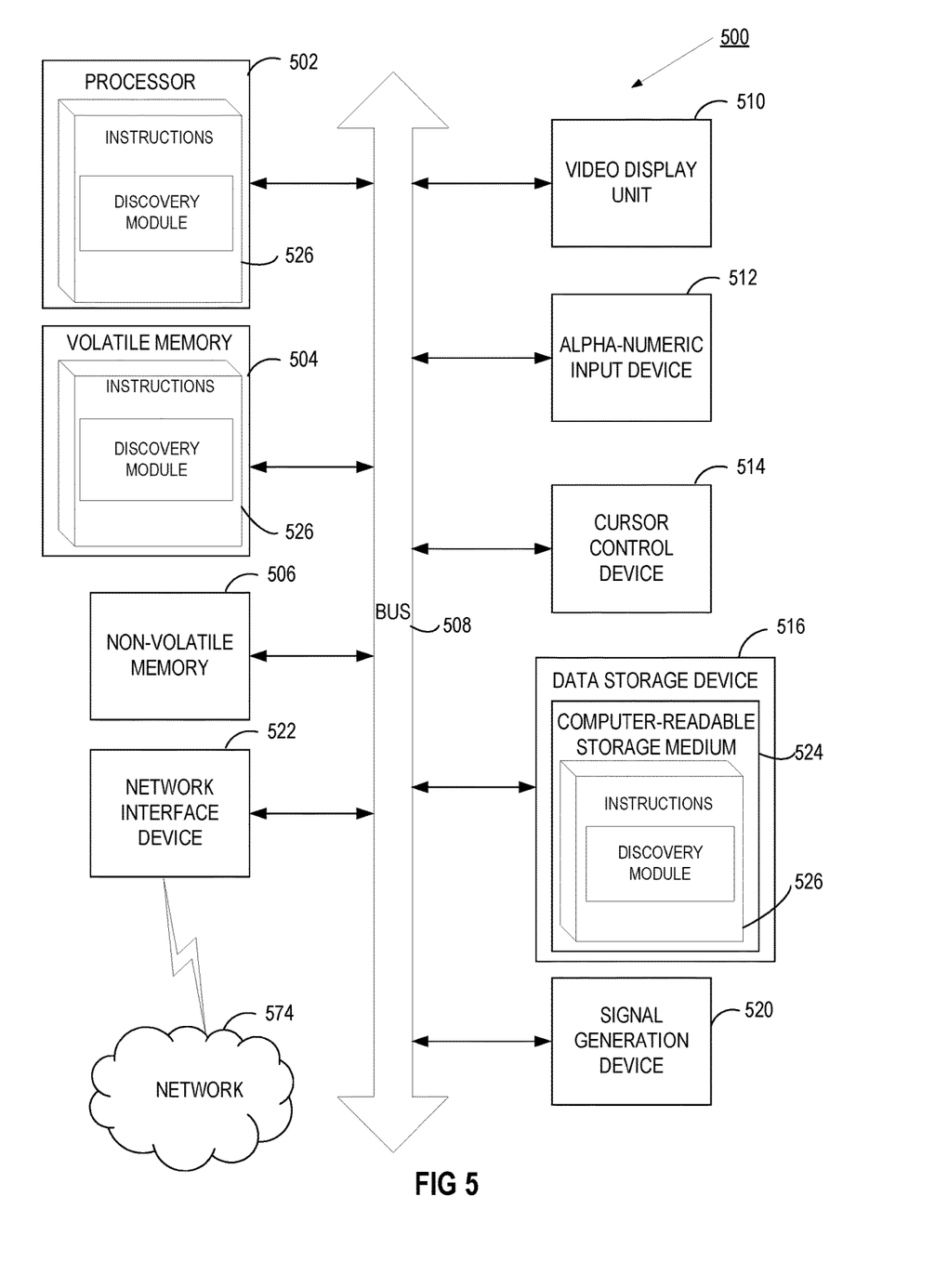
FIG. 5 depicts a block diagram of a computer system operating in accordance with one or more aspects of the present disclosure.

FIG. 5 depicts a block diagram of a computer system operating in accordance with one or more aspects of the present disclosure. In various illustrative examples, computer system 500 may correspond to one of the computing devices 110A-C of FIG. 1.

In certain implementations, computer system 500 may be connected (e.g., via a network, such as a Local Area Network (LAN), an intranet, an extranet, or the Internet) to other computer systems. Computer system 500 may operate in the capacity of a server or a client computer in a client-server environment, or as a peer computer in a peer-to-peer or distributed network environment. Computer system 500 may be provided by a personal computer (PC), a tablet PC, a set-top box (STB), a Personal Digital Assistant (PDA), a cellular telephone, a web appliance, a server, a network router, switch or bridge, or any device capable of executing a set of instructions (sequential or otherwise) that specify actions to be taken by that device. Further, the term "computer" shall include any collection of computers that individually or jointly execute a set (or multiple sets) of instructions to perform any one or more of the methods described herein.

In a further aspect, the computer system 500 may include a processor 502, a volatile memory 504 (e.g., random access memory (RAM)), a non-volatile memory 506 (e.g., read-only memory (ROM) or electrically-erasable programmable ROM (EEPROM)), and a data storage device 516, which may communicate with each other via a bus 508.

Processor 502 may be provided by one or more processing devices such as a general purpose processor (such as, for example, a complex instruction set computing (CISC) microprocessor, a reduced instruction set computing (RISC) microprocessor, a very long instruction word (VLIW) microprocessor, a microprocessor implementing other types of instruction sets, or a microprocessor implementing a combination of types of instruction sets) or a specialized processor (such as, for example, an application specific integrated circuit (ASIC), a field programmable gate array (FPGA), a digital signal processor (DSP), or a network processor).

Computer system 500 may further include a network interface device 522. Computer system 500 also may include a video display unit 510 (e.g., an LCD), an alphanumeric input device 512 (e.g., a keyboard), a cursor control device 514 (e.g., a mouse), and a signal generation device 520.

Data storage device 516 may include a non-transitory computer-readable storage medium 524 on which may store instructions 526 encoding any one or more of the methods or functions described herein, including instructions encoding first kernel 122, second kernel 142 of FIG. 1 for implementing methods 300 or 400.

Instructions 526 may also reside, completely or partially, within volatile memory 504 and/or within processor 502 during execution thereof by computer system 500, hence, volatile memory 504 and processor 502 may also constitute machine-readable storage media.

While computer-readable storage medium 524 is shown in the illustrative examples as a single medium, the term "computer-readable storage medium" shall include a single medium or multiple media (e.g., a centralized or distributed database, and/or associated caches and servers) that store the one or more sets of executable instructions. The term "computer-readable storage medium" shall also include any tangible medium that is capable of storing or encoding a set of instructions for execution by a computer that cause the computer to perform any one or more of the methods described herein. The term "computer-readable storage medium" shall include, but not be limited to, solid-state memories, optical media, and magnetic media.

The methods, components, and features described herein may be implemented by discrete hardware components or may be integrated in the functionality of other hardware components such as ASICS, FPGAs, DSPs or similar devices. In addition, the methods, components, and features may be implemented by firmware modules or functional circuitry within hardware devices. Further, the methods, components, and features may be implemented in any combination of hardware devices and computer program components, or only in computer programs.

Unless specifically stated otherwise, terms such as "loading," "transmitting," "receiving," "overwriting," "initiating," "discovering," "analyzing," or the like, refer to actions and processes performed or implemented by computer systems that manipulates and transforms data represented as physical (electronic) quantities within the computer system registers and memories into other data similarly represented as physical quantities within the computer system memories or registers or other such information storage, transmission or display devices. Also, the terms "first," "second," "third," "fourth," etc. as used herein are meant as labels to distinguish among different elements and may not have an ordinal meaning according to their numerical designation.

Examples described herein also relate to an apparatus for performing the methods described herein. This apparatus may be specially constructed for performing the methods described herein, or it may comprise a general purpose computer system selectively programmed by a computer program stored in the computer system. Such a computer program may be stored in a computer-readable tangible storage medium.

The methods and illustrative examples described herein are not inherently related to any particular computer or other apparatus. Various general purpose systems may be used in accordance with the teachings described herein, or it may prove convenient to construct more specialized apparatus to perform method 300 and/or each of its individual functions, routines, subroutines, or operations. Examples of the structure for a variety of these systems are set forth in the description above.

The above description is intended to be illustrative, and not restrictive. Although the present disclosure has been described with references to specific illustrative examples and implementations, it will be recognized that the present disclosure is not limited to the examples and implementations described. The scope of the disclosure should be determined with reference to the following claims, along with the full scope of equivalents to which the claims are entitled.

What is claimed is:

1. A method comprising:
   loading, by a processing device, a first kernel from a removable storage, wherein the first kernel identifies device information of a computing device when executed;
   transmitting, by the processing device, a provisioning request comprising the device information to a provisioning device over a network;
   receiving, by the processing device, provisioning data and a second kernel over a network, the second kernel comprising an operating system installer, wherein the provisioning data comprises information identifying a location on the network for an operating system installer and an instruction to overwrite the first kernel with the second kernel without rebooting; and
   overwriting the first kernel with the second kernel.

2. The method of claim 1, wherein the computing device loads the first kernel from the removable storage during a boot process and loads the second kernel received over the network without performing a reboot process.

3. The method of claim 1, wherein the computing device is lacking an operating system when initiating a hardware initialization procedure and installs an operating system received over the network without performing an additional hardware initialization procedure.

4. The method of claim 1, wherein the first kernel from the removable storage discovers the device information of the computing device and the second kernel installs an operating system selected in view of the discovered device information.

5. The method of claim 1, wherein overwriting the first kernel with the second kernel comprises overwriting a portion of memory comprising the first kernel with the second kernel while the first kernel is executing.

6. The method of claim 1, wherein overwriting the first kernel with the second kernel comprises:
   modifying a boot loader configuration of the computing device to identify the second kernel; and performing a hardware initialization procedure that loads the second kernel into memory.

7. The method of claim 1, wherein the computing device is assigned an IP address using a dynamic host configuration protocol (DHCP).

8. The method of claim 1, wherein the computing device is assigned a static IP address.

9. The method of claim 1, wherein the computing device is included within a computing environment that is lacking support for a preboot execution environment (PXE).

10. The method of claim 1, wherein the computing device is lacking a kernel prior to loading the first kernel from the removable storage.

11. The method of claim 1, wherein the provisioning request initiates a registration of the computing device on a provisioning system.

12. The method of claim 1, wherein receiving the provisioning data comprises receiving the provisioning data from the provisioning system.

13. The method of claim 1, wherein the provisioning request comprises at least one of: network information, processor information, memory information, or storage information.

14. The method of claim 1, wherein the removable storage includes a disk image comprising the first kernel and a user interface for receiving user input indicating a static IP address and a location of the provisioning device.

15. The method of claim 1, wherein the removable storage includes a disk image with an embedded static IP address.

16. The method of claim 1, wherein the removable storage comprises security information for adding the computing device to a computing environment.

17. A system comprising,
a memory; and
a processing device operatively coupled to the memory, the processing device to:
load a first kernel from a removable storage, the first kernel identifying device information of a computing device when executed;
transmit a provisioning request comprising the device information to a provisioning device over a network;
receive provisioning data and a second kernel over a network, the second kernel comprising an operating system installer, wherein the provisioning data comprises information identifying a location on the network for an operating system installer and an instruction to overwrite the first kernel with the second kernel without rebooting; and
overwrite the first kernel with the second kernel.

18. The system of claim 17, wherein the computing device loads the first kernel from the removable storage during a boot process and loads the second kernel received over the network without performing a reboot process.

19. A non-transitory machine-readable storage medium storing instructions which, when executed, cause a processing device to:
initiate a hardware initialization procedure on a computing device that is lacking a kernel;
receive, by the processing device, an indication that the computing device received a removable storage comprising a first kernel, wherein the first kernel identifies device;
transmit, by the processing device, a provisioning request comprising the device information to a provisioning device over a network;
receive, by the processing device, provisioning data and a second kernel over a network, the second kernel comprising an operating system installer, wherein the provisioning data comprises information identifying a location on the network for an operating system installer and an instruction to overwrite the first kernel with the second kernel without rebooting; and
overwrite the first kernel with the second kernel while the first kernel is executing.

20. The non-transitory machine-readable storage medium of claim 19, wherein the computing device loads the first kernel from the removable storage during a boot process and loads the second kernel received over the network without performing a reboot process.

* * * * *